Patented July 13, 1948

2,445,084

UNITED STATES PATENT OFFICE 2,445,084

PLASTICIZED ETHYL CELLULOSE COMPOSITION

Chessie E. Rehberg, Glenside, William C. Mast, Philadelphia, and Charles H. Fisher, Abington, Pa., assignors to United States of America as represented by the Secretary of Agriculture No Drawing. Application September 22, 1944, Serial No. 555,386

1 Claim. (Cl. 260—17)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to plastic compositions, and more particularly to compositions comprising cellulose ethers, acrylic resins, plasticizers, and modifiers.

An object of this invention is to produce compositions of matter in the form of permanently strong and flexible sheets or films of any desired thickness and which are flexible at low temperatures.

Another object is to provide plastic compositions which remain substantially unchanged in properties over a wide range of temperatures.

Still another object is to provide suitable plasticizers for use with ethyl cellulose, cellulose ethers, cellulose esters, and similar derivatives of carbohydrates of high molecular weight.

A further object of this invention is to provide soft, flexible and extensible compositions of matter which can be rolled, extruded, molded or otherwise worked into useful articles.

Other objects and advantages of this invention will appear from the following description.

We have found that esters of hydroxy acids, either with or without the hydroxyl group of the simple esters acylated with polybasic acids, are useful plasticizers for mixtures of cellulose ethers and acrylic resins. Among the esters which are particularly valuable for this purpose are the lactates of glycols and glycerol and those polyesters wherein alkyl or substituted alkyl esters of hydroxy acids are acylated with polybasic acids. Esters of the latter type may be represented by the formula (ROCOCR'R"O)nA wherein R is an alkyl or substituted alkyl radical, R' and R" are hydrogen or alkyl groups, A is the acyl radical of a polybasic acid and n is the valence of the radical A.

As disclosed in our copending application for patent, Serial No. 497,845, filed August 7, 1943, now abandoned, esters of this type may be prepared conveniently by treating an ester of a hydroxy acid with a polybasic acid, acid anhydride or acid chloride.

For the manufacture of the plastic compositions of this invention, the cellulose ether, acrylic resin, and plasticizer may be dissolved in a suitable solvent and then the solvent may be removed, as by evaporation. Another method comprises mixing the components by milling or other mechanical means. The products are flexible, tough, and rubbery, and these properties are maintained at low temperatures. The plastic compositions can be rolled, molded, extruded or otherwise shaped. For surface coatings or impregnations, solutions of the material may be sprayed or brushed on and the solvent allowed to evaporate. Fillers, dyes, pigments, and extenders may be incorporated in the product if desired.

The cellulose ether, acrylic resin and plasticizer may be used in various proportions, though, in general, we prefer 10-60 percent plasticizer. Generally, we also prefer to use more cellulose ether than acrylic resin. The acrylic resin may be any polymerized acrylic ester. For maximum tensile strength, we prefer polymerized methyl acrylate; while for softer, more flexible or elastic compositions, we may use the polymers of the ethyl, butyl, ethoxyethyl, or other ester. The plasticizer may be a glycol lactate, such as the mono- or poly-lactate of glycol, glycerol, polyethylene glycol, butylene glycol, polymethylene glycol, or other polyhydroxy alcohol; also, it may be an ester wherein a glycolic, lactic or other hydroxy acid ester is acylated with a polybasic acid, such as phosphoric, boric, oxalic, maleic, fumaric, aconitic, itaconic, adipic, succinic, sebacic, phthalic, chloromaleic, alkenylsuccinic, or other such acids.

The invention is illustrated, but not limited, by the examples given in Tables I and II. These examples were prepared by dissolving ethyl cellulose, the acrylic resin, and the plasticizer in acetone, pouring the solution into a flat dish and allowing the solvent to evaporate. The resulting films were examined for compatibility and test specimens were used in conjunction with a Scott IP-2 Serigraph to determine tensile strength and elongation at break. Brittle temperatures were determined with apparatus of the type described by Scilker and coworkers (Ind. Eng. Chem., 34, 157 (1942)). A Shore durometer (type A) was used to determine hardness.

TABLE I
Plastic compositions containing ethyl cellulose and modifiers

| Example | Plasticizer (percent by weight) | Methyl acrylate polymer, per cent by wt. | Tensile strength, lbs. per sq. in. | Ultimate elongation, per cent | Shore durometer hardness, Type A | | Brittle temp., °C |
|---|---|---|---|---|---|---|---|
| | | | | | Initial | After 10 seconds | |
| 1 | Bis-(methyl lactate)-phthalate (33) | 0 | 2000 | 35 | 70 | 68 | |
| 2 | Bis-(methyl lactate)-phthalate (50) | 5 | 2800 | 60 | 68 | 67 | |
| 3 | ....do | 10 | 3420 | 55 | 68 | 67 | |
| 4 | Bis-(methyl lactate)-phthalate (45) | 11 | 3600 | 35 | 75 | 71 | |
| 5 | Bis-(methyl lactate)-phthalate (33) | 13 | 3850 | 40 | 96 | 90 | |
| 6 | Bis-(methyl lactate)-phthalate (50) | 0 | 2660 | 40 | 83 | 82 | −18 |
| 7 | Bis-(methyl lactate)-maleate (50) | 0 | 3750 | 25 | 65 | 60 | |
| 8 | ....do | 5 | 2800 | 35 | 78 | 73 | |
| 9 | 2,3-Butyleneglycol dilactate (45) | 0 | 5660 | 85 | 90 | 87 | |
| 10 | 2,3-Butyleneglycol dilactate (40) | 0 | 2900 | 65 | 78 | 77 | |
| 11 | ....do | 12 | 2140 | 75 | 90 | 87 | |
| 12 | 2,3-Butyleneglycol dilactate (33) | 20 | 2910 | 50 | 60 | 58 | |
| 13 | 2,3-Butyleneglycol dilactate (45) | 5.5 | 872 | 40 | 62 | 59 | |
| 14 | Castor oil (50) | 0 | 2660 | 80 | 85 | 82 | below −75 |

TABLE II
Plastic compositions containing ethyl cellulose and modifiers

[Percent by Weight]

| Ethyl cellulose | Acrylic resin | Plasticizer |
|---|---|---|
| 30 | Methyl acrylate, 20. | Allyl lactate maleate, 50. |
| 30 | Methyl acrylate, 20. | Allyl lactate adipate, 50. |
| 30 | Methyl acrylate, 20. | Allyl glycolate phthalate, 50. |
| 30 | Ethyl acrylate, 20. | Methallyl lactate maleate, 50. |
| 30 | n-Butyl acrylate, 20. | Chloroethyl lactate sebacate, 50. |

The data in Table I include results obtained with ethyl cellulose plasticized with castor oil. The results show that the present invention may be used to prepare sheets or films having higher tensile strengths than that of the ethyl cellulose-castor oil film.

Having thus described our invention, we claim:

A plastic composition comprising ethyl cellulose; a polymerized ester of acrylic acid with a saturated lower aliphatic monohydric alcohol; and 10% to 60% of a dicarboxylic acid esterified alkenyl lactate, based upon the total weight of ethyl cellulose, polymeric acrylic ester, and said lactate; said alkenyl radical being taken from the group consisting of allyl and methallyl; said ethyl cellulose being present in an amount greater than that of said polymerized acrylic ester.

CHESSIE E. REHBERG.
WILLIAM C. MAST.
CHARLES H. FISHER.

REFERENCES CITED

The following references are of record in the file of this patent:

UNITED STATES PATENTS

| Number | Name | Date |
|---|---|---|
| 2,260,295 | Carruthers et al. | Oct. 28, 1941 |
| 2,268,651 | Eggert et al. | Jan. 6, 1942 |
| 2,292,393 | Mitchell | Aug. 11, 1942 |
| 2,370,566 | Muskat et al. | Feb. 27, 1945 |
| 2,384,117 | Muskat et al. | Sept. 4, 1945 |

OTHER REFERENCES

Ethyl Cellulose, Properties and Uses—Hercules Powder Co., 1944, page 35.